MEANS FOR NETWORK COMPUTATION

Filed Oct. 15, 1957 7 Sheets-Sheet 1

INVENTORS
FREDERICK C. BOCK
SCOTT H. CAMERON
BY HAROLD H. KANTNER

Hill Sherman Meroni Gross & Simpson

ATTORNEYS

INVENTORS
FREDERICK C. BOCK
SCOTT H. CAMERON
BY HAROLD H. KANTNER
Hill Sherman Meroni Gross & Simpson
ATTORNEYS

MEANS FOR NETWORK COMPUTATION

Filed Oct. 15, 1957 7 Sheets-Sheet 3

INVENTORS
FREDERICK C. BOCK
SCOTT H. CAMERON
BY HAROLD H. KANTNER

Hill Sherman Meroni Gross & Simpson
ATTORNEYS

*INVENTORS*
FREDERICK C. BOCK
SCOTT H. CAMERON
BY HAROLD H. KANTNER

Hill Sherman Meroni Gross & Simpson
ATTORNEYS

INVENTORS
FREDERICK C. BOCK
SCOTT H. CAMERON
BY HAROLD H. KANTNER
Hill Sherman Meroni Gross & Simpson
ATTORNEYS INVENTORS
FREDERICK C. BOCK
SCOTT H. CAMERON
HAROLD H. KANTNER
BY Hill Sherman Meroni Gross & Simpson
ATTORNEYS INVENTORS
FREDERICK C. BOCK
SCOTT H. CAMERON
BY HAROLD H. KANTNER
Hill Sherman Meroni Gross & Simpson
ATTORNEYS United States Patent Office 3,053,453
Patented Sept. 11, 1962

3,053,453

MEANS FOR NETWORK COMPUTATION

Frederick C. Bock, Scott H. Cameron, and Harold H. Kantner, Chicago, Ill., assignors to Armour Research Foundation of Illinois Institute of Technology, Chicago, Ill., a corporation of Illinois Filed Oct. 15, 1957, Ser. No. 690,249
1 Claim. (Cl. 235—185)

This invention relates generally to a means for solving certain types of network problems, and more specifically to a computer for finding the optimum path through a network, herein termed "optimizing."

Although the principles of the present invention may be included in various computers or computer networks, a particularly useful application is made in solving problems involving path selection where the same general type of problem is repeatedly solved, given a more or less constant set of fact conditions.

It is frequently desirable to determine which of several available paths is most preferable, and also to identify any equally preferable paths, solving this type of problem substantially instantaneously.

The present invention contemplates the construction of a computer network which is patterned after the available path segments in the problem. Thus, the computer network includes a plurality of legs so interconnected as to form a network which is an analog of the problem. Each of the legs has a critical property, usually all being of the same general type in a given network, and that property of each leg being scaled in magnitude to represent that characteristic of the path segment in the problem with respect to which an optimum solution is desired. Each of the legs further includes a property for indicating whether that leg comprises and represents any part of the optimum path. An excitation is applied to the network, which excitation is of a type which is amenable or compatible with the critical property of the network legs.

Once the network has been constructed and appropriately scaled, upon the application of the excitation to the network, the solution to the problem is immediately made apparent by the network itself.

Various structural elements may be utilized to construct the network analog. The circumstances surrounding a given problem will normally affect the conclusion as to which type of structural element is preferable. Therefore, while electrical networks may frequently be preferable, it is recognized that under certain conditions, mechanical networks would be more feasible.

The various available paths in the problem usually will not have identical properties and values. Accordingly, we have disclosed herein a selection of network legs from which various networks may be constructed, and have explained their uses.

Problems which involve the selection of an optimum path may be solved by the utilization of principles disclosed herein. It is also well known that duals of certain problems can be converted to networks of the type disclosed herein for solution. An example of this type of problem is the determination of the maximum flow which the network can accommodate between any two specified points.

It is, therefore, to be understood that specific networks disclosed herein are presented for purposes of explanation rather than for purposes of limitation. Likewise, the number of problem types which can be solved by this network is also substantial.

Accordingly, it is an object of the present invention to provide an optimum path network computer.

Another object of the present invention is to provide a network computer which indicates its solution substantially instantaneously.

Yet another object of the present invention is to provide a computer for solving the problem of selecting an optimum path from a plurality of available segmented paths.

A still further object of the present invention is to provide a computer for solving the problem of selecting the optimum quantities and the optimum routes for distributing a divided supply from a plurality of origins to and in accordance with the demand of a plurality of destination, there being a plurality of route segments available.

A still further object of the instant invention is the provision of a computer for solving the problem of selecting the optimum paths between one point and plurality of other points, there being a plurality of segmented paths available.

Another object of the present invention is to provide a computer network leg which may be used to represent a path segment in a network problem.

Still another object of the present invention is to provide means for constructing computer networks.

Many other advantages, features and additional objects of the present invention will become manifest to those versed in the art upon making reference to the detailed description and the accompanying sheets of drawings in which various preferred structural embodiments incorporating the principles of the present invention are shown by way of illustrative example.

Figures 1, 2:
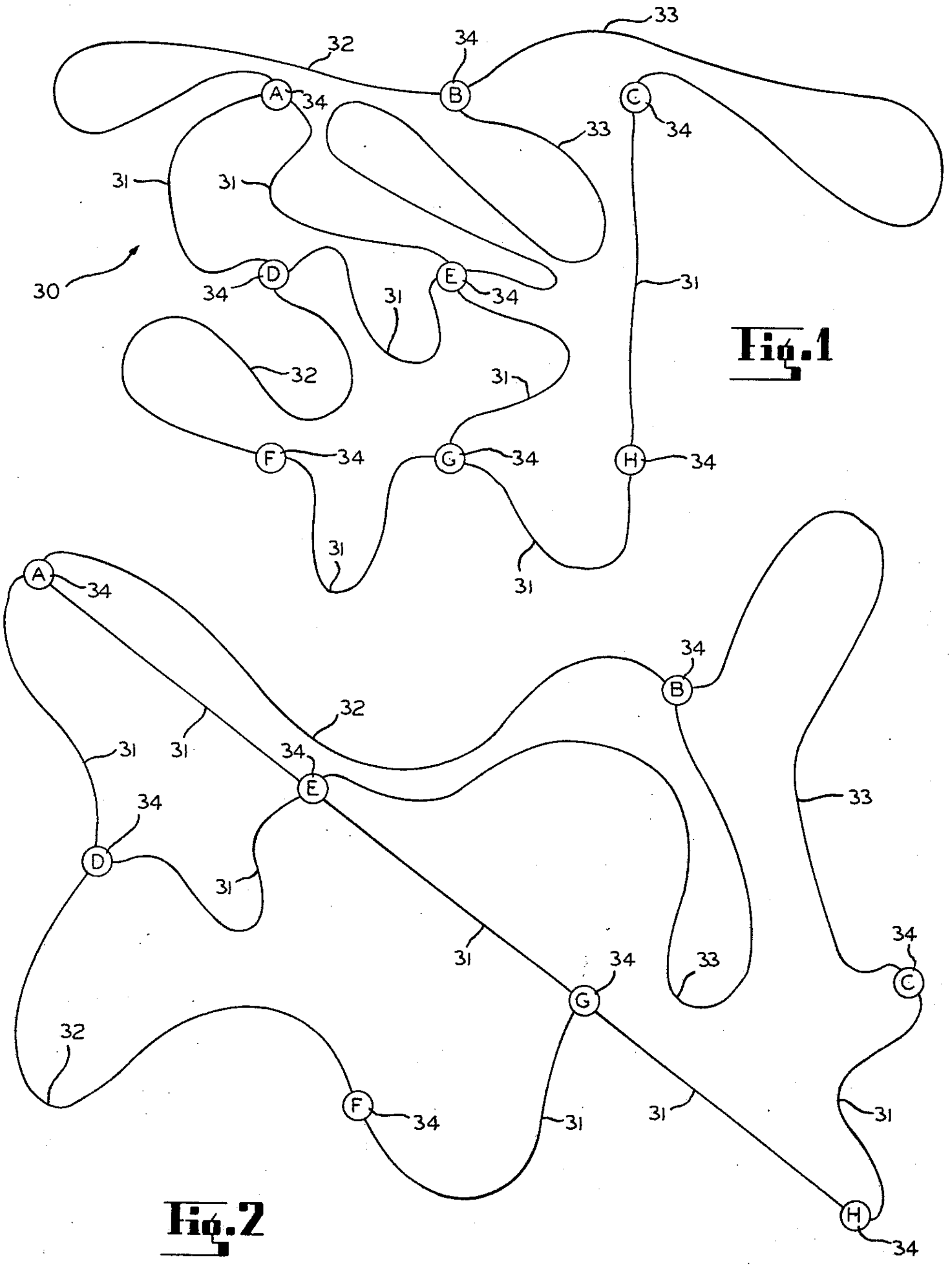
FIGURE 1 is a view of a mechanical computer constructed as an analog to a problem which has a substantially identical appearance.
FIGURE 2 shows the computer of FIGURE 1 arranged to indicate the optimum path between points "A" and "H"
Figures 6, 7, 8, 9, 10, 11:
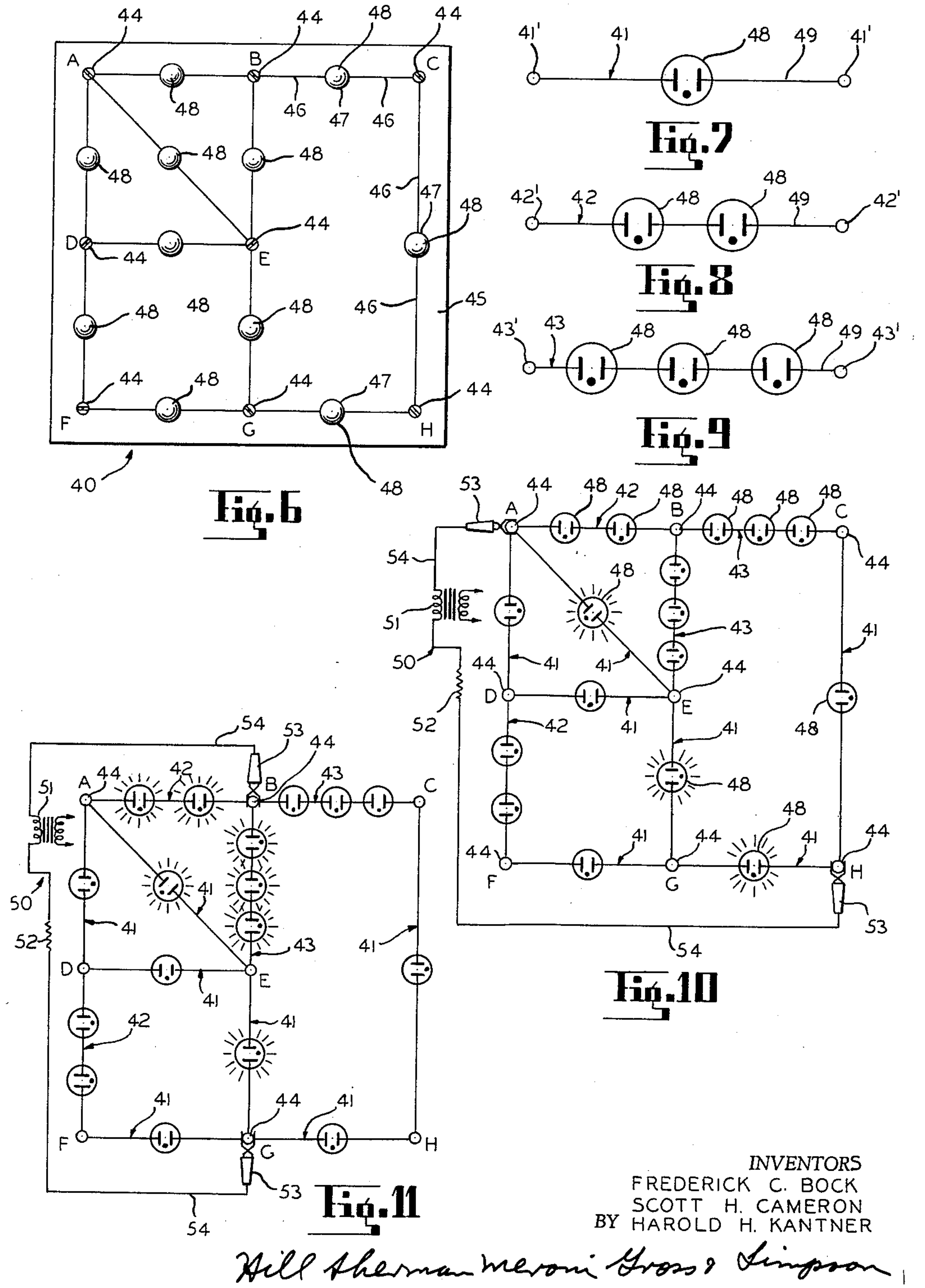
FIGURE 6 is a plan view of an electrical computer constructed as an analog of a problem that is substantially identical to FIGURE 1.
Figure 23:
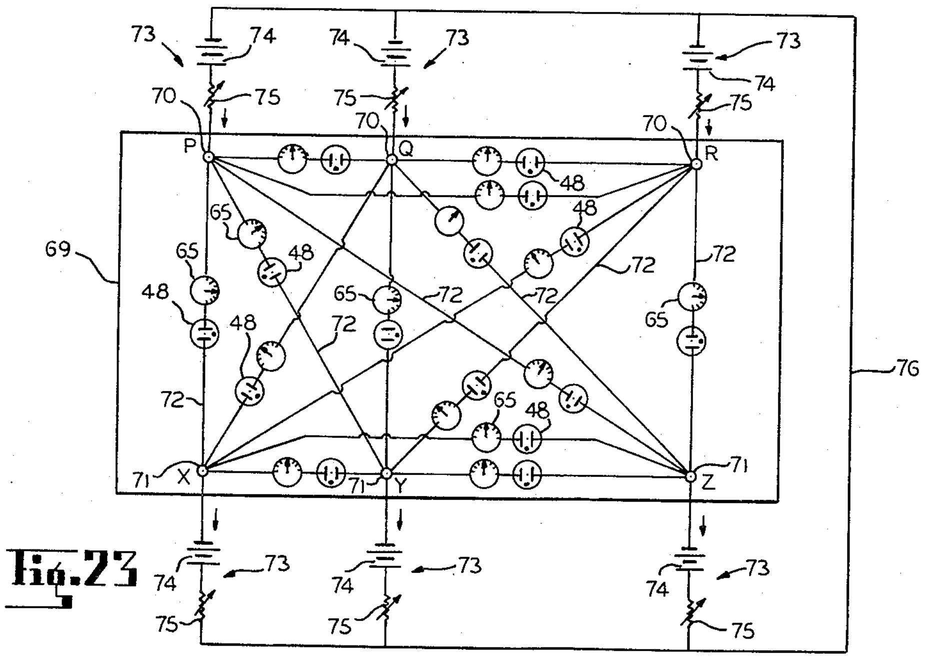
Figure 24:
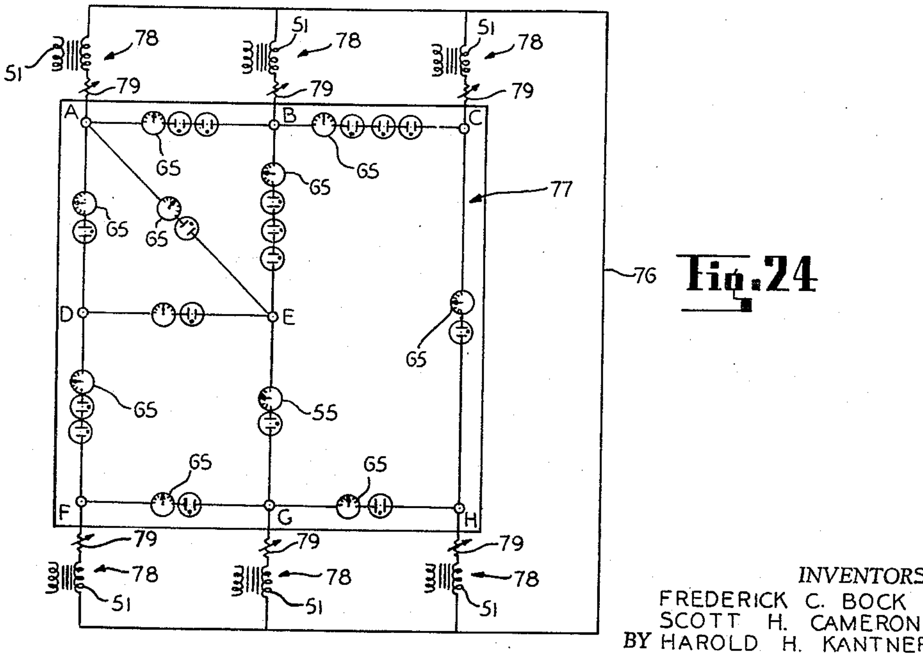
Figure 25:
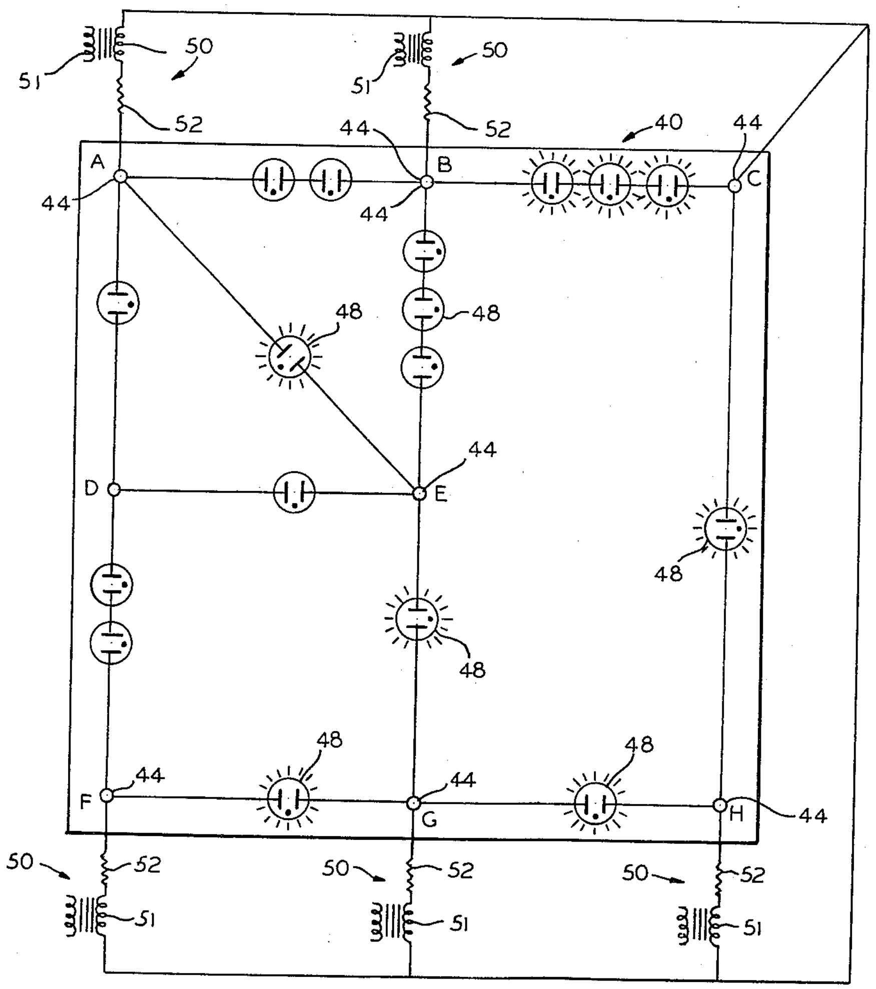
Figure 26:
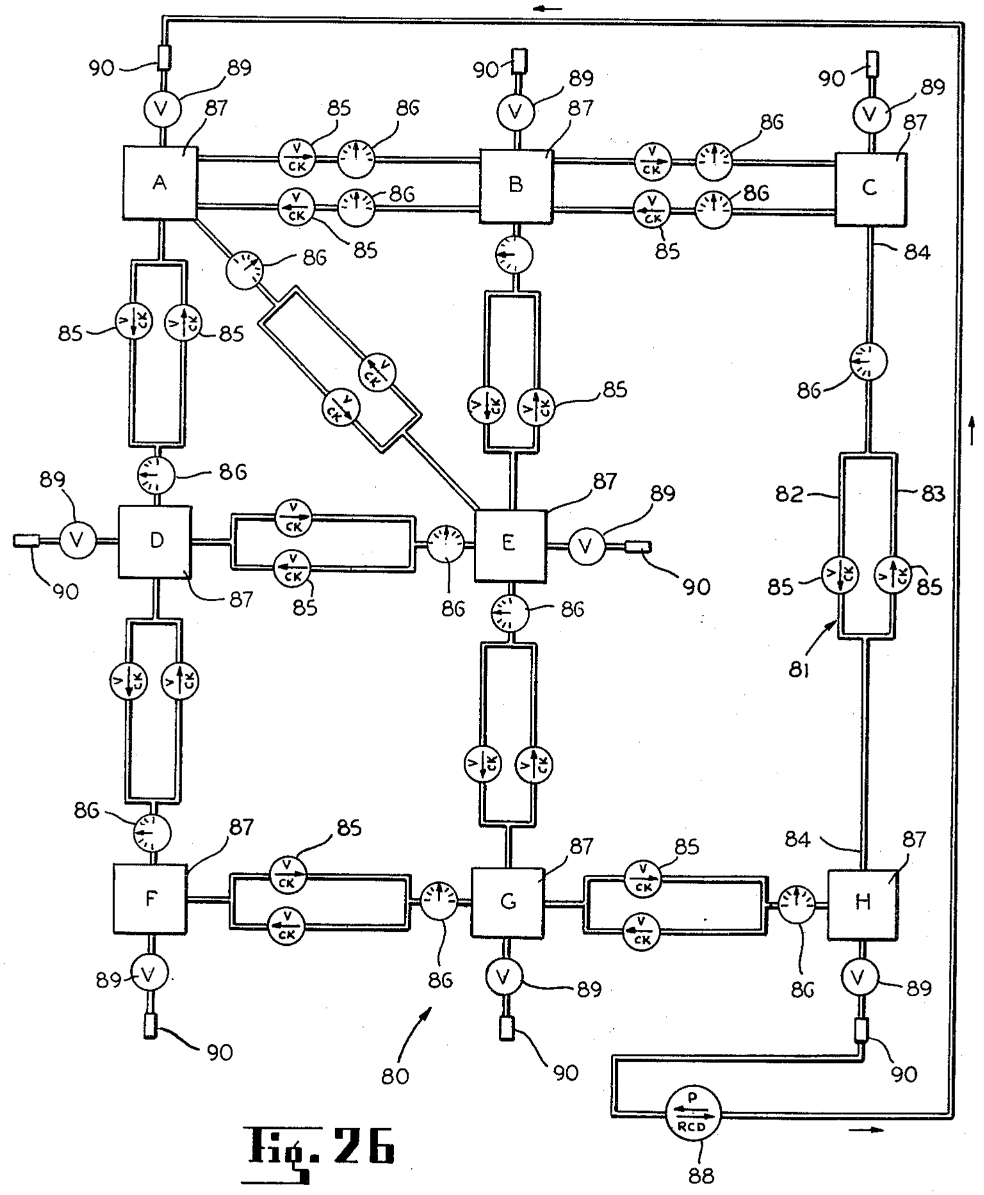

FIGURES 7, 8 and 9 each illustrate a computer network leg used within the structure of FIGURE 6 to scale the various legs thereof;

FIGURE 10 is a schematic diagram of the computer of FIGURE 6, indicating the optimum path between points "A" and "H";

FIGURE 11 shows the same structure as FIGURE 10, but indicates the optimum paths between points "B" and "G";

FIGURES 12–22 illustrate the structure and operation of various other legs which may be utilized in the contruction of electrical network analogs of various problems;

FIGURE 23 illustrates a computer network constructed to solve problems of distributing a given divided supply in accordance with a multiple demand;

FIGURE 24 is generally similar to FIGURE 23, except that the network problem suggested by FIGURE 1 has been incorporated therein;

FIGURE 25 indicates a network, using the problem suggested by FIGURE 1, the network being usable for simultaneously finding the optimum paths between a single point and a plurality of points; and FIGURE 26 is a fluid computer network constructed in accordance with the problem suggested by FIGURE 1.

As shown on the drawings:

The principles of this invention are particularly useful when embodied in a network computer assembly, such as illustrated in FIGURE 1, generally indicated by the numeral 30. The computer assembly includes a plurality of legs, e.g. 31, 32, and 33. Each of the legs 31, 32 and 33 have a length which is defined by its ends, each of which is fastened to a terminal 34, spaced from a like terminal at the other end of the leg. Thus, the legs 31–33 and terminals 34 are interconnected to define the network 30.

The various legs 31, 32 and 33 each comprises a cord or string, preferably of substantially inelastic line having a fixed length defined by knotted ends or portions received within the terminals 34.

Figures 3, 4, 5:
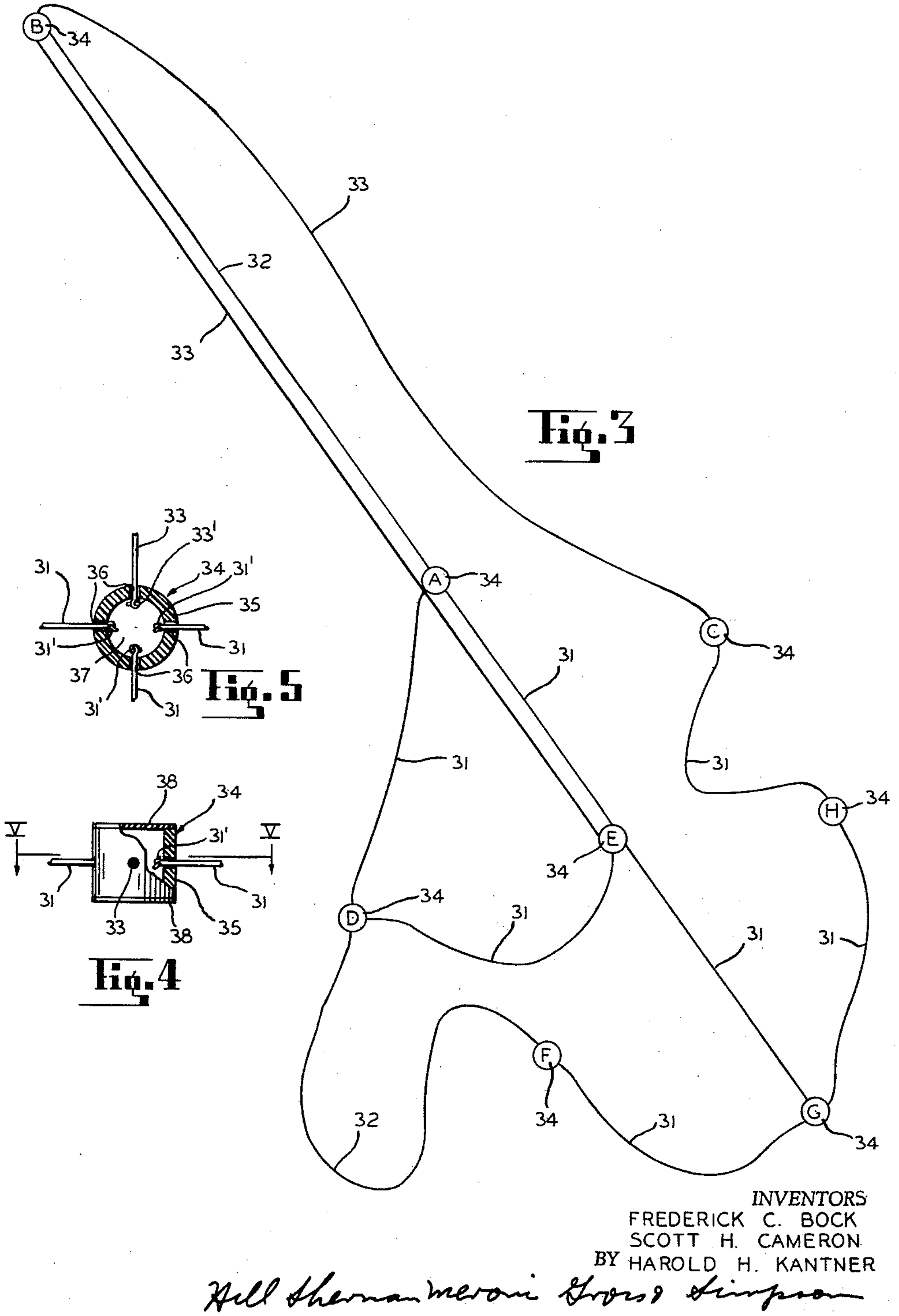
FIGURE 3 shows the computer of FIGURE 1 arranged to indicate the optimum paths between points "B" and "G"
FIGURE 4 is a side elevational view, partially in section, of a terminal used in the computer of FIGURE 1.
FIGURE 5 is a cross-sectional view taken along line V—V of FIGURE 4.

Referring to FIGURES 4 and 5, the detailed construction of the terminal 34 is shown. The terminal 34 includes a block 35, such as of plastic, which has a plurality of openings 36 extending into the interior thereof and communicating with a recess 37 or a hollow portion of the block 35 in which is received the knotted ends, e.g. 31′, 33′ of the various string legs 31–33. Each of the terminals 34 has a means 38 for distinguishing such terminal from the other terminals. The means 38 is here disclosed as comprising a closure or end or a portion of the terminal on which a suitable mark or design is placed by which it is identified.

By way of example, each of the terminals 34 may represent a geographical point. These points may stand for countries, cities, intersections, buildings, points on a transmission or other electrical network or the like. Letters A–H have been assigned to these points for purposes of identification and equivalent markings may be carried by the identification means 38 on the terminals 34.

Each available path segment in the problem between the various lettered points has a common characteristic which may differ in magnitude from that of the other segments. The problem of finding the optimum path between any two of such points is solved by finding that combination of one or more segments which jointly represent that path connecting such points and jointly having the lowest sum of such magnitudes. As used herein the term "optimizing of a characteristic" means finding the optimum path. By way of example, this characteristic may be a measure of distance, a measure of time, a measure of cost, an inverse indicia of traffic, or the like. Accordingly, each of the legs 31–33 is scaled in length so as to comprise an analog of the path segments available between the various points. It is to be understood, therefore, that the available paths disclosed in this problem are purely arbitrary, and would be increased or decreased, and otherwise altered to suit other problems to be solved.

Each of the legs 31–33 therefore, has a property of critical minimum value, namely its length when extended, which property is also described herein as being a threshold property. Thus, when a pair of terminals between which a leg extends are relatively displaced, that individual leg is brought into a straight or tensioned position. As used herein, the tensioned condition is a visual indication property for indicating that such leg comprises at least a portion of the optimum path between such points.

Thus, to find the optimum path between a given pair of points on the network of FIGURE 1, a pair of the terminals are relatively displaced to apply a tensioning force which distorts the network 30. The relative displacement is continued until tension exists in the one or more legs connecting the two terminals being displaced.

It is to be understood that the various legs 31–33 may be of any length. However, for the purpose of simplicity in this disclosure, the legs 32 and 33 have been made two and three times as long, respectively, as the legs 31. FIGURE 2, therefore, illustrates that the optimum path between terminals A and H includes the terminals E and G representing points E and G of the problem.

FIGURE 3 illustrates the optimum paths between terminals B and G. It may be seen that this solution includes the leg EG while the legs EB and EA—AB are both tensioned. In this embodiment of the invention, a pair of tensioned legs extending in the same direction indicates the optimum path to be either of a pair of routes. Thus the path GEAB is equal to the path GEB insofar as the characteristic is concerned according to which the various legs are scaled in length.

Computers of this type can be constructed to fit any similar problem wherein legs are selected in accordance with the characteristics to be optimized, after which the legs are connected together in a pattern corresponding to the problem. Thereafter, an excitation is applied to the network, such excitation here comprising relatively displacing the terminals between which the optimum path is desired. Thereafter, the optimum path may be determined such as by observing or otherwise noting which of the various legs are tensioned.

It is therefore apparent that other routes in FIGURES 2 and 3 between A and H and between B and G, respectively would be longer. It is therefore, further apparent that the characteristic to be optimized must be given a smaller value for a more desirable quantity of such characteristic and a larger value for a less desirable quantity of such characteristic.

The principles of this invention are further particularly useful when embodied in an electrical network computer assembly such as illustrated in FIGURE 6, generally indicated by the numeral 40. For ease of comparison, the network assembly 40 has been constructed as an analog of the problem illustrated by FIGURE 1, and includes a plurality of electrical legs 41–43 corresponding to the string or cord legs 31–33. Thus, in this illustration, it has again been assumed that the leg 42 of FIGURE 8 has a threshold property twice that of the leg 41 of FIGURE 7, while the leg 43 of FIGURE 9 has a threshold property having a magnitude three times that of the leg 41. The electrical computer assembly 40 includes a plurality of spaced electrical terminals 44 carried by an insulated base 45. Between the various terminals 44, there is connected one of legs 41–43 as best seen in FIGURE 10. On the face of the base 45 extending between the various terminals and adjacent to the various terminals 44, there may be included markings such as the letters A—H for identifying the terminals, and such as markings 46 carried on the face of the base 45 to indicate that there is a path between the terminals between which such line markings extend.

The base 45 is provided with a plurality of openings 47 extending therethrough, through which a luminous critical glow element 48 of one of the legs 41–43 may be observed. Thus, the network computer assembly 40 includes the spaced terminals 44 identified with various points in the problem and interconnected by a plurality of legs 41–43 having ends connected to the terminals 44 so as to define the network 30 which is patterned as an analog of the problem.

Each of the legs 41–43 includes 2, 3 and 4 segments of conductive material 49 which extends between the ends 41′—41′, 42′—42′ and 43′—43′. In series in each of the legs 41–43, there is at least one of the glow elements 48 which normally blocks current flow in the leg, and thus blocks current flow between the spaced connectors 44 between which such leg is carried. In the instant embodiment, the glow elements 48 comprise cold cathode gas discharge tubes which may be described as being normally non-conducting elements. However when the tube or bulb 48 is excited to a threshold or level of critical value, such potential ignites the tube, causing it to glow in a luminous fashion and to conduct a current flow therethrough. Thus, this tube has an operating or ignition threshold which may be called a threshold property or property of critical minimal value. When this threshold or value has been established, the leg, and in particular the tube 48, displays its visual indication property and also acts as a current flow indication means. The ignition potential or level of excitation is constant for a given tube or bulb and accordingly, this type of bulb may be selected so that its ignition potential, or sum of ignition potentials wherein more than one bulb is used, is a scalar representation within that leg of the characteristic to be optimized. It is to be understood that any number of glow elements 48 may be connected in series with each other, as best fits the characteristic of the problem to be optimized.

It is to be understood that the terminals 44, here shown to be flat headed screws, may comprise any convenient electrical terminal to which the means for connecting the leg to the network may be attached.

In the type of legs illustrated by FIGURES 7–9, if one element 48 conducts a current flow, each one of the elements 48 in such leg conducts such a flow. Since each one of these is luminous when conducting, it is apparent that any one of the elements 48 may be aligned with the opening 47 and that the legs 41—43 may be carried on either side of the base 45. While the glow element may comprise any gaseous cold cathode tube, for example, neon, argon, xenon, or mixed gases, neon bulbs are advantageous because of their availability.

The computer assembly 40 further includes an exciting means generally indicated by the numeral 50, which comprises a source of current adapted for connection to the terminals 44 of the network. The current source 50 comprises a source of potential 51, either A.C. or D.C., having a high resistance 52, for example, 220,000 ohms connected in series with the output. In the instant embodiment, the source of potential 51 is shown to comprise a transformer the primary of which may be connected to a commercial line potential, the secondary of which is provided with suitable lead wires 54 each having a clip or connector 53 which may be manually transferred to the various terminals 44.

The lead wires 54, therefore, comprise flexible conductors. While the source of potential 51 has been shown as comprising a transformer, it is to be understood that it could also comprise a source of D.C. potential such as a battery.

The current source 50 may be secured to the base 45, if so desired, or may be separate therefrom. Of course, the type of potential source selected must be compatible with the type of element 48 used in the network so as to be able to provide an excitation which is effective as to type and magnitude to cause the threshold to be reached at which the element 48 unblocks a current flow.

To operate the computer, the clips 53 are connected to the two terminals 44 between which identification of the optimum path is desired. In FIGURE 10, the clips 53 have therefore been connected to the terminals 44 identified as A and H. It can be seen that there are numerous possible paths extending between these two terminals, and that the impedance 52 is in series with each one of them. When the clips are so attached, the path having least sum of critical values or threshold values immediately is brought to its threshold level and begins to conduct current. Upon such conduction, certain of the elements 48 glow, as indicated in FIGURE 10, to thereby identify the optimum path. Thus, the optimum path includes one or more negative resistance gas tubes and has a high impedance which is common to the various alternative conduction paths having similar gas tubes. Even though an ignition potential is applied to the several tubes of the various paths simultaneously, only the tubes in the optimum path will ionize and remain ionized. This phenomenon is due to the fact that the element 48, when operated in its design current range, has a small dynamic impedance. Application of a current within the range to the circuit through a selected pair of terminals establishes a small total dynamic impedance in that path of series-connected elements having the least sum of critical potentials, which is the optimum path. Paths having a greater sum of critical potentials have a larger total impedance. Thus the indicative current path is established through the optimum path and its relatively small dynamic impedance establishes the terminal potential at the value of the sum of critical potentials despite current fluctuations, i.e., the path value does not change appreciably with current fluctuation. Thus significant current flow in all other paths of the network is prevented.

FIGURE 11 illustrates an interesting condition produced by connecting the clips 53 to the terminals 44 identified as B and G. It can be seen that the sum of thresholds along the path EB is identical to the sum of thresholds along the path EAB. Accordingly, such alternate paths both conduct and both indicate, thereby indicating that the path GEAB and the path GEB comprise two equally optimum paths between the points BG.

The solutions illustrated in FIGURES 10 and 11 are therefore identical to the solutions in FIGURES 2 and 3, respectively.

While FIGURES 7, 8 and 9 each represent simple legs which may be utilized in the construction of various networks, certain path segments, e.g. variable segments, can be more readily represented by other legs having slightly different construction.

Figure 14:
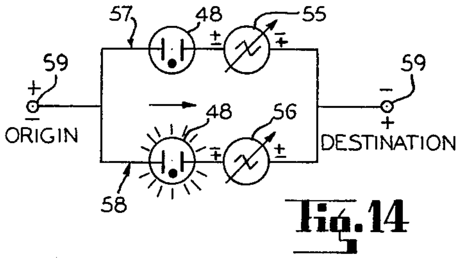
Figure 15:
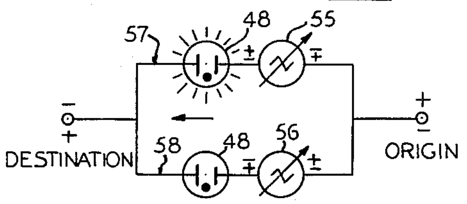

The simple legs of FIGURES 7–9 may in certain circumstances be replaced by legs such as shown in FIGURES 14 and 15. Where tubes 48 are available which have a wide range of ignition potentials, various scalar values may be obtained using a single element. On the other hand, when a given problem requires the use of a large number of elements in series, such large number even of itself is a disadvantage, and further, an excessive ignition potential may be thereby required. When the problem permits flow in one direction only, for example, a one-way street, where a problem requires a different value of the leg for each of the two directions, or where the problem requires that the value of the leg be variable, or be scaled extremely accurately, an analog of such path segment can be more easily constructed by use of the leg shown in FIGURES 14 and 15.

In this leg, two elements 48 are connected in parallel to each other and are each provided with a variable or fixed source of potential 55 and 56 biasing the elements 48 to modify the level of excitation thereof. In the instant leg, the biasing potentials 55 and 56 are provided in series with the elements 48 respectively to form a pair of parallel branches 57 and 58 having common ends 59. Thus the sources of potential comprise means for varying the effective ignition potential of each of the branches of the leg. Further, the source of potential 55 should have an opposite polarity or phasing from that of the source of potential 56. Of course, the sum of the potentials of the sources 55 and 56 is less than the combined ignition potential of the two elements 48. It is to be understood that the potential sources 55 and 56 may comprise conventional elements such as transformer windings, isolated autotransformers, or generators.

Instantaneous polarities have also been indicated in FIGURE 14. During one-half of the cycle, indicated by the upper set of designations, the potential source 56 aids the external current source 50 acting at ends 59 while the source of potential 55 opposes the external current source. Accordingly, the branch 58 becomes conductive and luminous. When the external polarities have been reversed, as shown in FIGURE 15, the branch 57 becomes luminous and conductive.

This being so, this type of leg may be used to represent an available route where the lower branch 58 represents a flow to the right, as shown in FIGURE 14, while the upper branch 57 represents a flow to the left, as shown in FIGURE 15. Furthermore, where the sources of potentials 55 and 56 are variable, they may be set to unequal values so as to represent a different value of flow in one direction than in the other direction.

Still further, assuming that such sources of potential are infinitely variable, the scalar value of the leg may be adjusted to an accuracy corresponding to several significant figures in the problem, even though only a single glow element 48 be utilized. Another advantage is obtained in that the values selected for the potentials 55 and 56 may be slightly below the ignition potentials, so that a considerable number of legs of this type may be brought into series with each other in a network without building up the overall potential requirement of the current source 50. Thus, where the potential sources 55 and 56 have equal potentials, the effect of the use of this type of leg is to lower the effective ignition potential and/or to increase the accuracy of the scalar representation of the leg.

Figure 12:
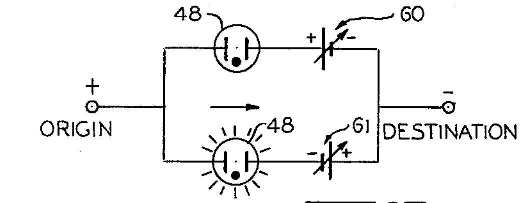
Figure 13:
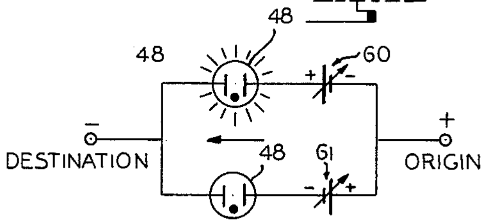

Referring now to FIGURES 12 and 13, a similar leg is disclosed, but wherein the potential sources are represented as variable sources of direct current, such as a generator, a battery with means for varying the potential, and the like. Accordingly, the sources of the potential have been indicated by numerals 60 and 61, respectively. The operation of the leg of FIGURE 12 is identical to the operation of the leg of FIGURE 14, during one half-cycle thereof.

Figure 16:
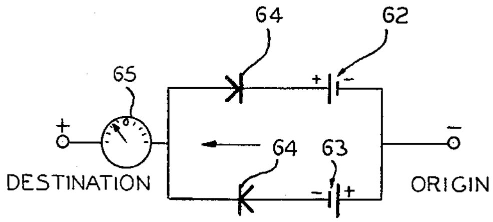
Figure 17:
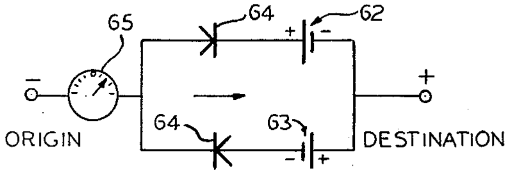

Referring now to FIGURES 16 and 17, these figures indicate that the potential sources 62 and 63, (as well as 55, 56, 60 and 61) may not need to be variable in certain networks, and may comprise batteries or generators. Furthermore, in place of the glow element 48, any diode may be used which will not be conductive until a threshold voltage has been applied, for example, a pair of diodes 64. Since these elements do not glow, a current flow indicator such as a meter 65 may be utilized to indicate flow. It can be seen that each of the branches of this type of leg is inherently a one-way conductor, and accordingly only one branch need be utilized if the problem so dictates.

Figure 19:
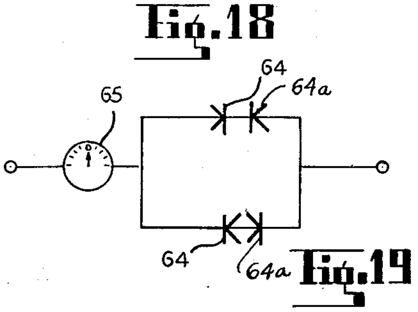

A leg similar to that of FIGURE 16 may also be used as before without the battery as illustrated by FIGURE 19. In this leg, a pair of elements has been provided, here comprising a pair of silicon diodes **64*a*, each of which possesses the property of effective self-bias, known as the Zener effect. The elements 64*a* utilize the Zener potential as the critical or threshold property. A pair of diodes 64** is also provided therewith to preclude reverse current flow.

Figure 18:
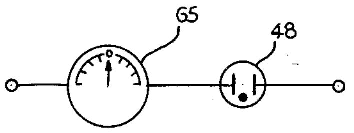

The meter 65 of the leg of FIGURE 16 indicates not only the existence of flow but the direction of flow. Furthermore, it indicates the quantity of flow. In certain types of network, described later herein, it is desirable also to know the quantity of flow. Accordingly, a meter 65 may be used in series with any one of the legs of FIGURES 7–9 as shown in FIGURE 18.

Figure 22:
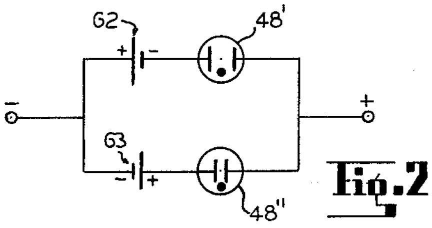

Referring to FIGURE 22, the glow element 48′ indicates a tube having a somewhat higher ignition potential than that of the glow tube indicated by the numeral 48″. Therefore, a leg similar to that shown in FIGURE 12 may be provided by the use of elements having different or variable internal spacing, thereby varying the ignition potential of each of the branches of the leg which include a battery.

Figure 20:
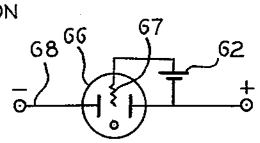
Figure 21:
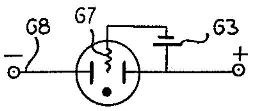

Referring to FIGURES 20 and 21, where a glow tube 66 which includes a biasing grid 67 is utilized, the potential sources 62 and 63 may be applied between the grid 67 and one end of the leg. Thus when the grid 67 is of a potential opposite in phasing or polarity to the end 68 of the leg, the ignition potential has been effectively lowered (FIG. 20), and when the grid 67 has the same phasing or polarity as the end 68 of the leg, the ignition potential has been effectively increased (FIG. 21).

It is to be understood that when the network is to be excited by alternating current, the network must comprise alternating current legs, and that direct current legs are used in a D.C. network. As the D.C. leg of FIGURE 12 may be converted to an A.C. leg of FIGURE 14, so may also other of the legs disclosed herein be converted for use in an A.C. network.

While an indication property, such as a visual indication property, is frequently desired in a leg, such property is not necessarily essential to operativeness. Thus if it is not necessary to identify one or more legs as comprising a part of the solution to the problem, the indication means or property need not be included in such network legs.

Referring now to FIGURE 25, an electrical computer assembly network 40 identical to that shown in FIGURE 6 has been provided. In addition, a plurality of current sources 50 have been provided, each of which is connected at one side to a point in the network assembly 40, in this example point C, representative of a point in the problem to or from which all the optimum paths between the point C and points A, B, F, G and H are desired to be known. Of course, one current source 50 could be successively connected between point C and each of these other points, and each optimum path noted. However, a plurality of current sources 50 may be simultaneously used as indicated hereon to simultaneously obtain all such optimum paths as a composite solution. The answers to questions of this type, assuming there are no pairs of equivalent paths in the answer, form a branching tree beginning at the point C. Thus the optimum path between C to F is the path CHGF, and the optimum path between A and C is the path CHGEA. Of course, if point B or G were used in place of point C in the instant problem, the alternate paths would also be indicated as illustrated by FIGURE 11.

Referring now to FIGURE 23, another interesting network problem is indicated. The structure shown hereon includes an insulated base 69 having a plurality of terminals 70, identified hereon by the letters P, Q and R, and each representing an origin point. Further, base 69 includes a plurality of terminals 71 designated hereon by the letters X, Y and Z, each representing a destination point. In this problem there is a leg 72 extending from each one of the origin and destination points to the other origin and destination points. Thus, in this problem the network is constructed to show that there is a path available from each origin to each destination, between each pair of origins, and between each pair of destination points. In this network, for purposes of illustration, legs of the type shown in FIGURE 18 have been used. It is to be understood, however, that any leg may be used which may be adapted to scalarly represent the penalty of unit transport over that route segment, and which indicates not only flow, but measures the amount of flow. Thus in this network, the various elements 48 each have an ignition potential which is a scaler representation of the per unit penalty, and as such may differ between themselves in this respect. Further, each of the legs 72 thus includes a meter 65, preferably of the type that indicates no current at the midpoint on its scale, and which can therefore deflect in either direction depending upon the direction of current flow.

Points P, Q and R represent origins or sources of supply which, taken together, have a divided supply. Points X, Y and Z each represent a destination or point of demand which taken together equal the supply, but not necessarily divided in the same proportions. Here the problem is to determine not only the paths to be utilized, but the quantity or proportion of the available supply to be distributed or sent along the various utilized path segments such that the total penalty, e.g. cost, is a minimum. Accordingly, a variable current source 73, here illustrated as comprising a D.C. potential 74 and a variable resistor 75 having a high impedance, is connected at one side thereof to each of the sources of supply and points of demand. It will be noted that the polarities of the points of origin are opposite to those of the points of destination, thereby electrically distinguishing the nature of the point. Further, each of the variable resistors 75 are so adjusted that the amount of current passing therethrough is proportional to the supply or demand at the adjacent point as the case may be. The other or opposite side of each of the sources of supply 73 are connected together and whereby the current flowing in the line 76 scalarly represents the total supply or demand.

Thus a current representative of the total supply passes in the line 76 and is distributed and directed into various points of the network representing origins, such distribution being made proportionately to the various supplies present at the origin points in the problem. Likewise, the same quantity of current is withdrawn from various points representing the destinations in amounts proportioned to the various demands. The network, having been constructed of legs of the type having the critical threshold and indicating properties described herein, will conduct the total current through a plurality of paths as represents the optimum paths to be used in the distribution. Further, this will cause the various elements 48 to indicate such paths, while the meters 65 will show the quantity (and in this example, the direction) of such shipments or movements. It is to be understood that networks of the type disclosed herein may be constructed of any one of the various types of legs which measure flow, and may include such normally non-conducting elements, biasing means, and current supplies as may be desired.

Referring now to FIGURE 24, an electrical network 77 similar to the elecrical network 40 has been provided, except that a meter 65 has been added to each of the legs. Further, a variable A.C. current-source 78, comprising a source of A.C. potential 51 and a variable high impedance resistor 79, has been connected at one side of each thereof to points A, B, and C to represent points of origin and to points F, G and H to represent points of distination. The current supplies 78 connected to points A, B and C are phased alike, but opposite to the phasing of the current supplies connected to points F, G and H, thereby characterizing the one group as a group of origins and the other as a group of destinations. Further, the variable resistor 79 of each of the current supplies 78 is adjustable to allow a current to flow which scalarly represents the supply or demand at the adjacent point. Again, all the current flows through line 76 to complete the circuit. The circuit of the network 77 further differs from the network of FIGURE 23 in that there are less available paths from and to each of the points, and in that there are intermediate points, indicated as D and E hereon, which may represent junction points, intersections or any other intermediate point which is neither an origin or a destination, but through which traffic or interchange may take place.

When a current supply 78 is used which is alternating, care must be taken in reading the meters 65 since the direction of flow is not indicated thereby, unless a phase sensitive current meter is employed. However, since the sum of all currents into a point equals the sum of all currents away from that point, the direction of flow can be established by simple interpretation.

The principles of this invention may also be utilized when embodied in a hydraulic or pneumatic computer assembly 80 such as shown in FIGURE 26. The computer assembly 80 comprises a plurality of legs 81 each being tubular and adapted to conduct a flow of fluid. Each of the legs 81 includes one or two branches 82, 83 which are connected in parallel and which may have one or two common ends 84. The computer assembly 80 includes a plurality of spaced terminals or manifolds 87 which serve as connectors or terminals for connecting the various legs 81 into the network 80. The branches 82 and 83 of the leg 81 may join together to form the common end 84 either before such branches communicate with the manifold 87, or else the manifold 87 may comprise the means for so joining together the ends to a common point.

The fluid flow network may thus be constructed in a pattern which represents the available paths in the problem. Each of the manifolds 87 represents a point in the problem and may be so identified, the manifolds here being identified in accordance with the problem illustrated in FIGURE 1, and interconnected by the various legs 81. Each of the legs 81 of the fluid flow network 80 includes an element within each branch 82 and 83 thereof, which normally blocks flow, here comprising check valves 85. Each of the check valves 85 has a threshold property or property having a critical minimal value which is scaled in accordance with the problem characteristic to be optimized. Thus, in the instance of check valves, the operating threshold or cracking pressure is selected to scalarly represent the various available paths.

It is to be understood that the use of a check valve is illustrative, and that any valve which is yieldably biased to its closed position and which has a cracking pressure which is or can be scaled, for example, by selection or adjustment, in accordance with a problem characteristic, may be utilized. Thus an in-line relief valve having an adjustable cracking pressure is an equivalent valve to a check valve for the present purpose.

Once one of the check valves 85 has been cracked to an open position so as to permit a fluid flow therethrough, a flow indication means 86, comprising a part of the branch 82, 83 or of the common portion 84 of the leg 81 indicates such flow. Any one of several flow indicators, such as a sight tube or flow meter may be utilized in the instant network. Where the network is utilized in a manner equivalent to FIGURES 23, and 24, of course the flow indicator 86 is a flow meter. Thus by inclusion of the flow indication means 86, the leg 81 has a property for visually indicating when such leg is excited. A source of flow 88, here comprising a reversible constant delivery pump, and which is adapted for connection to the various manifolds 87 provides an excitation force or pressure of sufficient magnitude to crack open the various check valves 85 in the optimum path. Thus the source of pressurized fluid flow or pump 88 may be connected to the manifolds A and H to cause a flow in a direction indicated by the arrows. When the various legs shown in FIGURE 26 are scaled in accordance with the problem suggested by FIGURE 1, the flow indicators will indicate the optimum path to be from A to E to G and to H.

For purposes of illustration, each of the manifolds 87 have been provided with a valve 89 which is used as a shutoff valve when the pump 88 is not connected thereto, and a coupling 90 connected thereto for joining the pump 88 thereto.

It is to be understood that the valve 89 and coupling 90 may be any equivalent means, for example, a self-sealing quick-disconnect coupling.

When the pump 88 is operated, valves 89 of the manifolds 87 identified as A and H are opened, thereby placing a pressure difference between these two points. The paths having the check valves 85 with the lowest total cracking pressure represent the optimum path or paths and such check valves will crack open to permit flow therethrough which is indicated by the various legs.

Accordingly, it can be seen that a novel type of network computer has been provided wherein various analogous legs may be selected and connected to represent the problem after which an excitation causes the network to indicate the solution. Further, examples of various types of problems which can be solved have been given and legs of various types having different properties to represent different factors or characteristics have been disclosed which can be utilized in the construction of networks to fit various problems.

Although various minor modifications might be suggested by those versed in the art, it should be understood that we wish to embody within the scope of the patent warranted hereon all such embodiments as reasonably and properly come within the scope of our contribution to the art.

We claim as our invention:

In an electrical computer network representing a network problem, the improvement of a leg for the computer network, said leg representing a path segment of the problem, said leg comprising a pair of parallel branches having common ends; a normally non-conducting cold cathode glow discharge tube in each branch, which branches are rendered alternatively conductive and luminous upon the application of a predetermined ignition potential of the proper polarity; a source of biasing potential in series in each of said branches and imparting opposite polarities thereto; one of said tube and said potential source of each of said branches having means for varying the effective ignition potential thereof to a value scale in accordance with the path segment; and means for connecting said leg to the network; whereby said branches may represent mutually independently scaled opposite directions in the path segment of the problem.

References Cited in the file of this patent

UNITED STATES PATENTS

| | | |
|---|---|---|
| 1,988,459 | Pennybacker | Jan. 22, 1935 |
| 2,509,042 | McIlroy | May 23, 1950 |
| 2,608,770 | Hansford | Sept. 2, 1952 |
| 2,934,273 | Elmore et al. | Apr. 26, 1960 |

OTHER REFERENCES

Korn and Korn: Electronic Analog Computers, 1956, McGraw-Hill, New York, page 292.

Electronic Engineering Principles (Ryder), Prentice-Hall, 1952, page 333.